June 25, 1935. H. I. LEWIS ET AL 2,005,827
HOLLOW DRILL SHARPENER
Filed Nov. 18, 1933

INVENTORS
HARRY I. LEWIS
FREDERICK W. SEYBOLD
ATTORNEYS

Patented June 25, 1935

2,005,827

UNITED STATES PATENT OFFICE 2,005,827

HOLLOW DRILL SHARPENER

Harry I. Lewis and Frederick W. Seybold, Dayton, Ohio, assignors to Harris Seybold Potter Company, Cleveland, Ohio, a corporation of Delaware Application November 18, 1933, Serial No. 698,660

5 Claims. (Cl. 76—82)

This invention relates to improvements in hollow drill sharpeners, and comprises a simple device by means of which the internally beveled cutting edge of the drill may be reamed and put into good cutting condition without removing the drill from the machine. A machine of this character is illustrated and described in detail in our copending application Serial No. 687,586, filed August 31, 1933. It is to be noted that the machine is adapted to operate a number of drills simultaneously, the spindle carriers being removably connected with the drive shaft in order that different numbers of carriers may be applied to the shaft at different times in order to form the required number of holes in different pieces of work. The sharpener of the present invention may be used upon each drill in succession without removing any of them from the machine, and consequently contributes greatly to the economical servicing of the machine.

The principal object of the invention is the provision of a device of the character stated, simple in construction, and adapted to perform its function quickly and efficiently without the removal of the drills from the spindles.

Other objects and features of novelty will appear as we proceed with a description of that embodiment of the invention which, for the purposes of the present application, we have illustrated in the accompanying drawing, in which Figure 1 is an elevational view, partly in vertical section, of a fragment of a multiple spindle paper drilling machine, showing our drill sharpener in operative position with respect to one of the drills of the machine.

Figure 1:
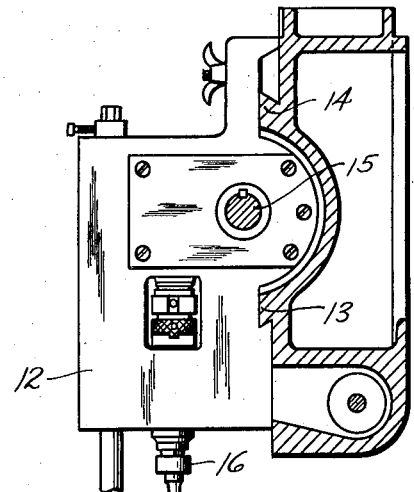
Figure 3:
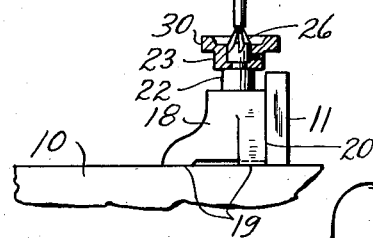
Fig. 3 is a horizontal sectional view taken substantially on the line 3—3 of Fig. 2.
Figure 3:
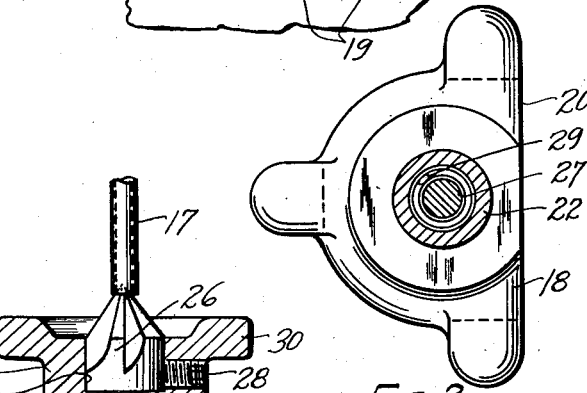
Figure 2:
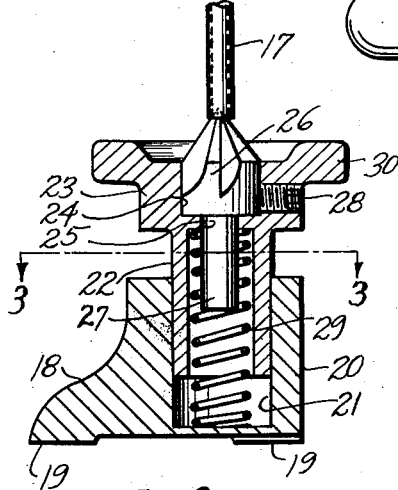
Fig. 2 is a vertical sectional view of the drill sharpener on a larger scale.
Figure 4:
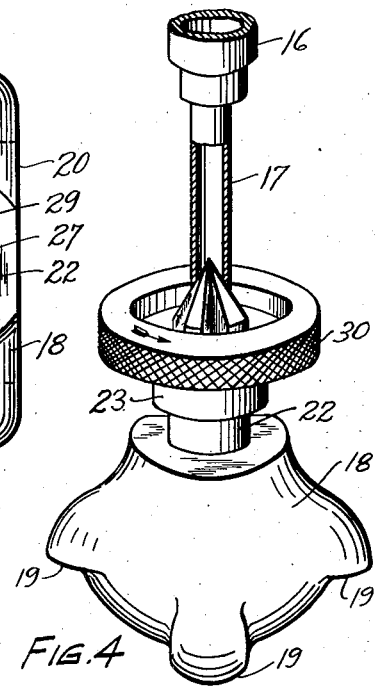
Fig. 4 is a perspective view of the sharpener with the lower end of a hollow drill with which it is cooperating shown in vertical section.

Referring first to Fig. 1, a fragment of the table of a paper drilling machine is shown at 10. 11 is the back gauge of the machine, which is ordinarily adjustable forwardly and backwardly on the table in order to fix the distance between the centers of the drills and the adjacent edges of the sheets. One of the spindle carriers of the machine is illustrated at 12. These carriers are adjustable transversely of the machine upon dovetail ways 13 and 14, and each carrier encloses a spindle driving mechanism splined to a driving shaft 15 which extends through the carrier. The spindle is indicated at 16, and mounted in it and depending therefrom is the hollow drill 17. The latter has a cylindrical outer surface on its lower end and a beveled inner surface running down to the cutting edge. The drills are rotated and fed into the work simultaneously by suitable means, not shown.

The sharpener comprises a base member 18 having a machined lower surface 19. In the form illustrated the surface 19 is in three parts providing a three point support. The base member 18 also has a flat rear surface 20, machined at right angles to the surface 19, and adapted to abut against the forward surface of back gauge 11. In the base member 18 there is formed a well or socket 21, the side walls of which form a cylindrical guide surface with an axis at right angles to the surface 19 and parallel to the surface 20.

The second member of the sharpener comprises a hollow post 22 which has a cylindrical outer surface fitted to the cylindrical surface of socket 21, and movable therein both longitudinally and rotatably. On the top of post 22, and preferably integral therewith, there is a head 23 which has a central cylindrical cavity 24 connected with the hollow interior of post 22 by a central hole 25. The cavity 24 and hole 25 together constitute a chuck for the sharpening tool which has a cylindrical portion 26 fitting the cavity 24 and a stem 27 extending through the hole 25 and down into the hollow interior of the post 22. A set screw 28 threaded into the head 23 engages the cylindrical portion 26 of the tool and prevents it from turning within the head, while permitting its ready removal for servicing or replacement. The upper end of the sharpening tool is tapered to a point and is adapted to enter the lower end of the hollow drill. The tool may be a hard steel reamer, as illustrated, although not necessarily so, as other tools, such for instance as grinding stones, may be employed if desired, it being understood that in any event the tool shall have the upper conical or tapered form illustrated.

A coil spring 29 surrounds stem 27 of the tool and is enclosed within the hollow post 22, bearing at its upper end against the head 23 and at its lower end against the bottom of socket 21. Head 23 is provided with some sort of hand grip in order to facilitate the rotation of the head. In the present instance the head is enlarged at its upper end to form a knurled collar 30 which may be turned readily by the thumb and fingers of the operator.

*Operation.*—Whenever it is desired to sharpen the drills of a machine with which our sharpener is to be used, the drills are caused to assume a predetermined position with respect to the bed or table 10 of the machine, that is they are spaced a predetermined distance above the table. The back gauge 11 is positioned behind the line of centers of the drills a distance equal to the distance between the rear surface 20 of the sharpener base and the axis of the cylindrical guide surfaces of the sharpener.

Then, while the drills are standing still, the operator grasps the knurled collar 30 of the sharpener and moves the latter over the surface of the table to a position where its flat rear surface 20 abuts against the back gauge 11. He now pushes down upon the collar 30, depressing the head against the action of spring 29, moving the sharpener along the surface of the table and along the surface of the back gauge 11 until the point of the tool stands below the center of one of the hollow drills 17, when he permits the spring 29 to act to raise the tool into operative relation with the drill. He then holds the base 18 with one hand and turns the knurled collar 30 with the other hand. During such rotation of the sharpener the spring 29 maintains a pressure sufficient to cause the sharpening tool to act effectively. A very few turns of the knurled collar are sufficient to recondition the cutting edge of the drill.

The operator then depresses the collar 30 so as to lower the tool out of contact with the drill, after which he moves the sharpener along the back gauge into position below the next drill and repeats the foregoing operations, this procedure being followed for each drill in the machine. Thereafter, any wire edge which may be left by the reaming operation should be removed. This is done preferably by rotating the drills under power, and holding against the outer surface of each drill a piece of hard wood or a honing stone.

The whole procedure can be very quickly carried out, and the maintenance of the cutting edges of the drills in first class condition is thus so facilitated that the machine operator willingly and gladly employs the sharpener often enough to insure keen cutting drills at all times, with the consequent high class work which results therefrom.

Variations from the described structure may be employed. Accordingly we desire it to be understood that the scope of the invention is to be regarded as defined exclusively by the appended claims rather than by the foregoing description or the accompanying illustration.

Having thus described our invention, we claim:

1. In a device of the character described, a base member with a flat supporting under surface and with a cylindrical guide surface at right angles to said supporting surface, a second member having a cylindrical surface fitting the cylindrical surface of the base member and movable with respect thereto both longitudinally and rotatably, said second member having a sharpening tool rotatable therewith and axially arranged with respect to said cylindrical surfaces, and a spring tending to separate said members longitudinally.

2. In a device of the character described, a base member having two flat surfaces meeting in a line, one of said flat surfaces being an under supporting surface and the other being adapted to abut against a gauge, said base member having a cylindrical guide surface at right angles to the supporting flat surface, a second member having a cylindrical surface fitting the cylindrical surface of the base member and movable with respect thereto both longitudinally and rotatably, said second member having a sharpening tool rotatable therewith and axially arranged with respect to the said cylindrical surfaces, and a spring tending to separate said members longitudinally.

3. In a device of the character described, a base member with a flat supporting under surface and with a cylindrical guide surface at right angles to said supporting surface, a second member having a cylindrical surface fitting the cylindrical surface of the base member and movable with respect thereto both longitudinally and rotatably, said second member having a sharpening tool rotatable therewith and axially arranged with respect to said cylindrical surfaces, and a spring tending to separate said members longitudinally, said second member comprising a hand grip by means of which rotation may be imparted to it manually.

4. In a device of the character described, a base member having a flat supporting surface adapted to rest upon a table and a cylindrical guide surface, a second member having a cylindrical surface fitting the cylindrical surface of the base member and movable with respect thereto both longitudinally and rotatably, said second member comprising a hand grip by means of which rotation may be imparted to it manually, a tool chuck in said second member axially arranged with respect to said cylindrical surfaces and adapted to hold an upwardly directed tool, and a spring tending to separate said members longitudinally.

5. In a sharpener for hollow drills adapted to be employed in connection with the hollow drills of a paper drilling machine wherein each drill depends vertically from a driving head above a work supporting table, a base member having a flat under surface adapted to rest upon the table and having a vertical cylindrical guide surface, a second member having a vertical cylindrical surface fitting said first named cylindrical surface and movable with respect thereto both vertically and rotatably, said second member comprising a sharpening tool with a conical upper end axially arranged with respect to said cylindrical surfaces, and a spring tending to hold said second member at a height such that the tool will extend above the level of the lower ends of the drills, whereby the second member may be depressed against the action of the spring and the sharpener moved into position beneath the drill, after which the second member may be rotated to sharpen the hollow drill.

HARRY I. LEWIS.
FREDERICK W. SEYBOLD.